US006625248B2

(12) United States Patent  
Mason et al.

(10) Patent No.: US 6,625,248 B2
(45) Date of Patent: Sep. 23, 2003

(54) PROCESS FOR THE TREATMENT OF RADIOACTIVE GRAPHITE

(75) Inventors: J. Bradley Mason, Pasco, WA (US); David Bradbury, Tresham Wotton-Under-Edge Glos (GB)

(73) Assignee: Studsvik, Inc., Erwin, TN (US)

( * ) Notice: Subject to any disclaimer, the term of this patent is extended or adjusted under 35 U.S.C. 154(b) by 0 days.

(21) Appl. No.: 09/968,811

(22) Filed: Oct. 1, 2001

(65) Prior Publication Data

US 2002/0064251 A1 May 30, 2002

Related U.S. Application Data

(63) Continuation-in-part of application No. 09/418,132, filed on Oct. 14, 1999.

(51) Int. Cl.[7] .................................................. G21F 9/28
(52) U.S. Cl. ...................... 376/325; 376/310; 376/316; 376/312; 376/300; 376/301; 376/350; 376/262; 376/368; 376/458; 376/904; 414/146; 423/418.2; 423/414; 423/415.1; 423/437.2; 588/1; 588/18; 588/19; 588/20; 252/625; 252/636; 252/639; 252/638; 264/0.5
(58) Field of Search .................... 588/1, 18, 19, 588/20; 423/437.2, 418.2, 414, 415.1; 264/0.5; 252/625, 636, 639, 638; 414/146; 376/316, 310, 312, 288, 262, 300, 301, 325, 350, 368, 458, 904

(56) References Cited

U.S. PATENT DOCUMENTS

| | | | | |
|---|---|---|---|---|
| 3,085,958 A | * | 4/1963 | Knights et al. ............. 376/458 |
| 3,090,742 A | * | 5/1963 | Fawcett ....................... 376/210 |
| 3,105,804 A | * | 10/1963 | Cottrell et al. .............. 376/291 |
| 3,219,540 A | * | 11/1965 | Costes ......................... 376/220 |
| 3,392,570 A | * | 7/1968 | Bonjour et al. ............... 374/11 |
| 3,453,090 A | * | 7/1969 | Schulten et al. ............... 423/4 |
| 3,984,519 A | * | 10/1976 | Dolci et al. .................... 423/4 |
| 4,145,396 A | * | 3/1979 | Grantham .................... 588/201 |
| 4,167,444 A | | 9/1979 | Schweiger .................... 176/37 |
| 4,228,141 A | | 10/1980 | Sugikawa et al. .......... 423/415 |
| 4,507,267 A | | 3/1985 | Hinssen et al. ................ 423/4 |
| 4,655,968 A | | 4/1987 | Queiser et al. ............. 252/632 |
| 4,687,600 A | * | 8/1987 | Kronschnabel et al. ..... 252/639 |
| 5,207,532 A | * | 5/1993 | Mason et al. .......... 405/129.25 |
| 5,277,846 A | * | 1/1994 | Tanari ......................... 588/14 |
| 5,335,609 A | | 8/1994 | Nelson et al. ............... 110/346 |

(List continued on next page.)

FOREIGN PATENT DOCUMENTS

| | | | |
|---|---|---|---|
| EP | 0703587 A2 | * | 3/1996 |
| FR | 2691524 | * | 5/1992 |
| GB | 2328784 A | | 3/1999 |
| WO | WO 00/77793 | * | 3/2000 |

OTHER PUBLICATIONS

Moghissi, et. al. (Edit.): Controlled Air Batch Pyrolysis. Radioactive Waste Technology, ASME, 1986, pp. 305–311.
C.E. Stevensen, et. al. (Edit.): Head–End Processes for Graphite–Base and Carbide Reactor Fuels. Progress in Nuclear Energy: Series III –Process Chemistry, vol. 4, Pergamon Press, 1970, pp. 123–1234.

Primary Examiner—Michael J. Carone
Assistant Examiner—John Richardson
(74) Attorney, Agent, or Firm—Michael A. Mann; Sara A. Centioni; Nexsen Pruet Jacobs and Pollard, LLC

(57) ABSTRACT

A process for the treatment of radioactive graphite which includes the following steps: (i) reacting the radioactive graphite at a temperature in the range of from 250° C. to 900° C. with superheated steam or gases containing water vapor to form hydrogen and carbon monoxide; (ii) reacting the hydrogen and carbon monoxide from step (i) to form water and carbon dioxide; and (iii) reacting the carbon dioxide of step (ii) with metal oxides to for carbonate salts. The process enables radioactive graphite, such as graphite moderator, to be treated either in-situ or externally of a decommissioned nuclear reactor.

13 Claims, 1 Drawing Sheet

U.S. PATENT DOCUMENTS

| | | | |
|---|---|---|---|
| 5,394,448 A | * 2/1995 | Guiroy et al. | 376/260 |
| 5,424,042 A | * 6/1995 | Mason et al. | 422/159 |
| 5,449,505 A | * 9/1995 | Gay | 423/332 |
| 5,513,582 A | 5/1996 | Antonini et al. | 110/238 |
| 5,535,609 A | 7/1996 | Kuo | 70/423 |
| 5,745,861 A | 4/1998 | Bell et al. | 588/1 |
| 5,909,654 A | * 6/1999 | Hesbol et al. | 588/19 |
| 6,084,147 A | 7/2000 | Hedengren et al. | 588/19 |
| 6,240,985 B1 | * 6/2001 | Mason | 141/198 |
| 6,280,694 B1 | * 8/2001 | Mason | 423/239.1 |

* cited by examiner

US 6,625,248 B2

PROCESS FOR THE TREATMENT OF RADIOACTIVE GRAPHITE

PRIORITY

This application is a continuation-in-part of U.S. patent application 09/418,132, filed Oct. 14, 1999, which is incorporated herein by reference.

FIELD OF THE INVENTION

The present invention relates to a process for the treatment of radioactive graphite and, in particular, the radioactive graphite which results from the graphite which is used as a moderator material in a number of nuclear designs.

BACKGROUND OF THE INVENTION

Graphite, which consists predominantly of the element carbon, is used as a moderator in a number of nuclear reactor designs, such as the MAGNOX and AGR gas cooled reactors in the United Kingdom, and the RBMK design in Russia. During construction, the moderator of the reactor is usually installed as an interlocking structure of graphite bricks. At the end of reactor life, the graphite moderator, typically weighing about 2,000 tons, is a form of radioactive waste which requires safe disposal.

Graphite is a relatively stable chemical form of carbon, which is in many ways suitable for direct disposal without processing. However, after neutron irradiation, the graphite will contain stored Wigner energy. The potential for release of this energy needs to be accommodated in any strategy which relies on disposing of the graphite in unprocessed form. Alternatively, processing the graphite before disposal can allow the safe release of any stored Wigner energy.

The graphite also contains significant quantities of radionuclides from neutron induced reactions, both in the graphite itself and in the minor impurities which it contains. The radioisotope content can conveniently be divided into two categories—short-lived isotopes and long-lived isotopes. Short-lived isotopes (such as cobalt-60) make the graphite difficult to handle immediately after reactor shutdown, but they decay after a few tens of years. Long-lived isotopes (principally carbon-14) are of concern through the possibility of their discharge to the biosphere. Processing the graphite offers the opportunity to separate the majority of the graphite mass (carbon) from the short-lived radioisotopes. This in turn facilitates disposal of the graphite waste shortly after the end of reactor life, and may permit recycling.

Because of the characteristics of graphite and its mass, the most common procedure to date for decommissioning of graphite moderated reactors is to store the reactor core in-situ for a period of tens of years following reactor shut-down. During this period, short-lived radioisotopes decay sufficiently to allow eventual manual dismantling of the graphite moderator. Most plans in the United Kingdom then assume that the graphite will be disposed of in its existing chemical form, with appropriate additional packaging to prevent degradation or release over the long period of carbon-14 decay.

Storage has certain negative consequences, such as the following: 1) an implication of long-term financial liability, 2) a visually intrusive storage structure that has no productive purpose, and 3) a requirement for a future generation (which gained no benefit from the original asset) to complete eventual clearance. If the storage alternative is to be replaced by shorter term management, it is essential for the graphite to be processed in a safe and radiologically acceptable manner.

Thus there remains a need for a better way to handle radioactively contaminated graphite than storing it.

SUMMARY OF THE INVENTION

Accordingly, a preferred embodiment of the present invention provides a process for the treatment and recycling of radioactive graphite that includes the following steps: (i) reacting the radioactive graphite at a temperature within the range of 250° to 900° C. with superheated steam or gases containing water vapor to form hydrogen and carbon monoxide; (ii) reacting the hydrogen and carbon monoxide from step (i) to form water and carbon dioxide; and (iii) reacting the carbon dioxide from step (ii) with metal oxides to form carbonate salts.

A major feature of the present invention is that the process can be used to separate efficiently the carbon in the graphite from other radioactive elements present in the moderator to allow the ease of handling.

Another major feature of the present invention is that the process can be used to process individual blocks or particles of graphite removed from the reactor core in a conventional manner.

Yet another major feature of the present invention is that the process can also be used to react the moderator graphite slowly, in-situ in a slow and controlled manner without the need for human intervention.

Other features and advantages will become apparent to those skilled in the art from a careful reading of the Detailed Description of Preferred Embodiment accompanied by the following drawings.

DETAILED DESCRIPTION OF THE PREFERRED EMBODIMENTS

Figure 1:
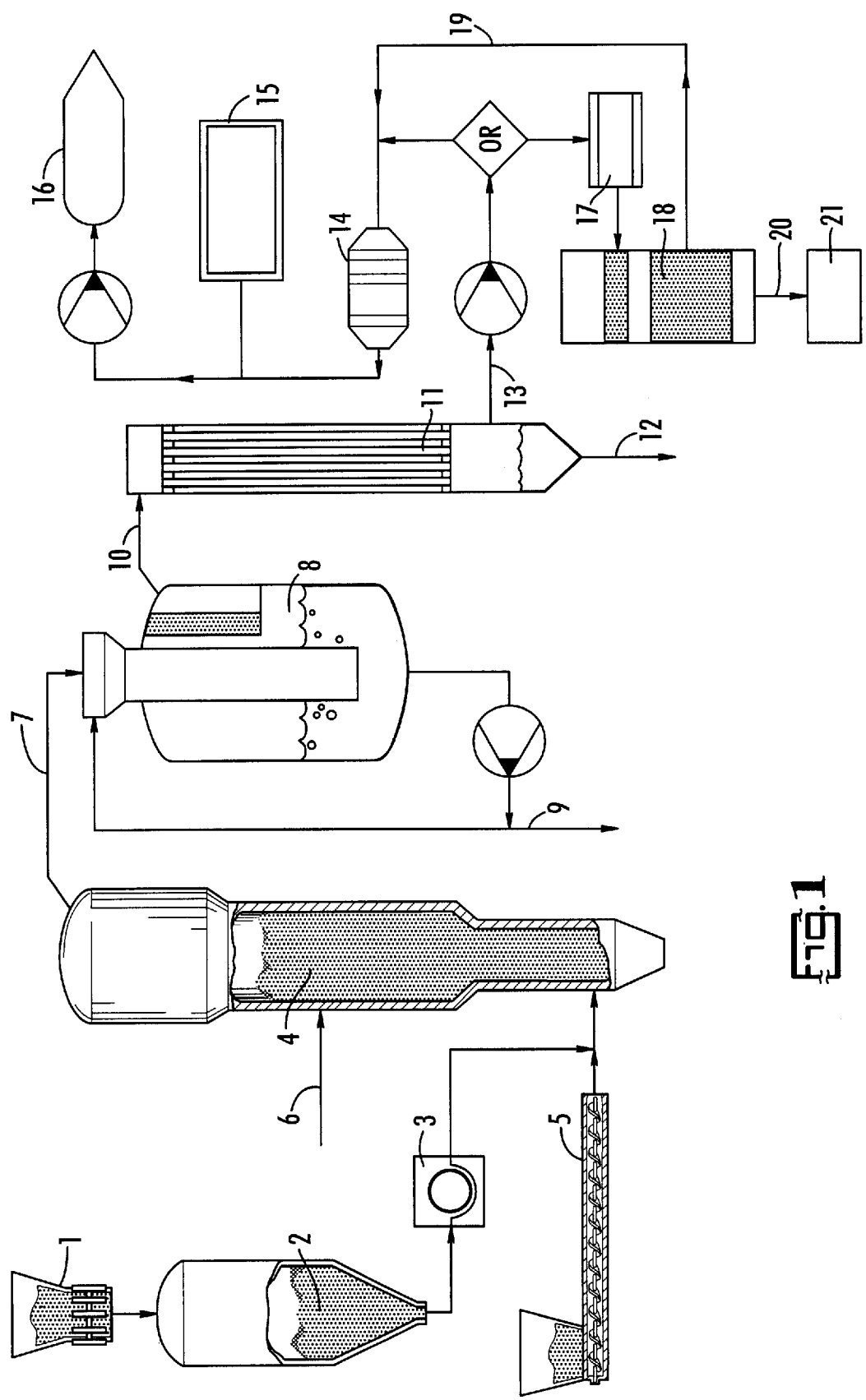
FIG. 1 of the present invention is a flow diagram of a process of treating radioactive graphite.

The present invention is a process applied to graphite materials previously used as the moderator in the core of a thermal nuclear reactor and which are no longer required for this purpose. It also applies to any other graphite materials (fuel element sleeves, braces etc.) irradiated in the neutron flux of a nuclear reactor core.

In a preferred embodiment, the present invention provides a process including the following steps: (i) reacting the radioactive graphite with superheated steam or gases containing water vapor to form hydrogen and carbon monoxide; (ii) reacting the hydrogen and carbon monoxide from step (i) to form water and carbon dioxide; (iii) reacting the carbon dioxide from step (ii) with a magnesium or calcium oxide to form magnesium or calcium carbonate; and (iv) processing of radioactive contaminants. In step (i) of the process of the present invention, the reaction of superheated steam or gases containing water vapor with graphite is carried out at a temperature within the range of 250° to 900° C., preferably between 600° to 700° C., to form hydrogen and carbon monoxide. This type of process is generally referred to in the art as "steam reforming". The reaction in step (i) may be carried out with the addition of oxygen to the steam or gases containing water vapor to provide exothermic reaction energy for the process. The addition of oxygen also enables the temperature of the steam reforming reaction to be controlled.

The gases from step (i) are then further oxidized in step (ii) with oxygen to form carbon dioxide and water. During the process, the gases are retained in an enclosed vessel under an inert atmosphere.

In the preferred embodiment, the carbon dioxide and water are disposed of in a third step including the chemical processing of the carbon dioxide to create a suitable solid waste form for disposal. Preferably, the carbon dioxide is reacted with magnesium or calcium oxides to produce insoluble magnesium or calcium carbonate salts.

Alternatively, the carbon dioxide and water which are produced in the process may be disposed of subsequently by a number of procedures including the following: (1) controlled discharge of the carbon dioxide to the atmosphere, after further processing necessary to minimize its radioactive content; (2) compression and liquification of the carbon dioxide for temporary storage, processing transportation or disposal; (3) condensation of steam to provide water for treatment, disposal or release.

Finally, in the fourth step of the process of the present invention, the remaining radioactive contaminants contained in the radioactive graphite are processed.

The process of the present invention may be carried out either within the containment a decommissioned nuclear reactor or may be applied (in externally provided equipment) off site.

Radioactive secondary waste from the process of the invention or from further processing of the carbon dioxide produced in the process prior to discharge, can be dealt with in any conventional manner appropriate to normal procedures of the nuclear plant concerned.

In-situ processing of graphite requires that the graphite in the nuclear reactor containment be subjected to conditions suitable for the gasification of graphite. The in-situ reactions can be performed by various methods, as discussed below.

In a first method, carbon dioxide, nitrogen or other inert gas maybe recirculated through the reactor containment using normal in-plant equipment with the addition of small, controlled amounts of steam and/or oxygen, when required. A side stream is continuously extracted from the loop for the removal of carbon monoxide, hydrogen, and carbon dioxide. To mitigate the potential of a hydrogen explosion a catalytic hydrogen converter is preferably inserted in the treatment loop to convert any hydrogen to water. This option requires the injection of a small amount of oxygen into the catalytic converter.

For the addition of trace amounts of oxygen, the reactor circuit is maintained above 250° C. for oxidation reactions to proceed in sufficient time to allow the use of less than 5% oxygen concentration in the recirculating gases. The use of restricted oxygen levels is recommended to eliminate potential explosion reactions.

For the addition of steam, the reactor circuit is maintained above 350° C. for the reformation reactions to proceed at reasonable rates.

In a second method, gases are injected into and removed from the nuclear reactor containment without the use of other in-plant equipment. This method involves the isolation of the graphite moderator from the balance of plant systems. An external gas recirculation loop can be utilized to inject gases into the nuclear reactor containment and provide removal of gaseous reaction products. Selected areas of the reactor containment can be maintained at high temperature by the injection of superheated gases at 400° to 900° C., or by the generation of the needed heat inside the reactor containment. Heat generation inside the reactor containment can be achieved by the insertion of electrical or combustion tube heaters placed in one or more of the fuel channels. The in-situ reaction utilizing this method allows the preferential removal of the graphite in selected areas of the nuclear reactor in order to remove graphite in a planned sequence. This feature is an extremely valuable safety mechanism, because it allows the graphite to be removed in a structurally secure manner, avoiding the possibility of collapse of a weakened moderator structure during the later stages of removal. The feasibility of local removal of graphite by this method is further aided by the decreased thermal conductivity of graphite in end-of-life moderators, which occurs as a result of neutron irradiation. It is estimated that over 75% of the graphite could be removed this way. The injected gases may consist of an inert gas and steam, together with oxygen, as required. Final removal of the last traces of graphite could, for example, be achieved by reverting to the previous method discussed above.

When the process of the present invention is carried out on pieces or particles of the graphite which have been removed from the reactor core, the process may be carried out as a continuous, semi-continuous or batch process. The process may be carried out using a stationary bed formed from the graphite particles or pieces or, alternatively in a fluidized bed reactor. Preferably, the bed will be fluidized using the steam reactant as the fluidization aid, but it will be appreciated that the reactant bed may be fluidized using an inert gas, such as nitrogen or carbon dioxide, with the appropriate injection of steam and/or oxygen, to enable the reaction to proceed. Inert bed material can be utilized in the fluid bed to stabilize the temperature where steam and/or oxygen is injected into the vessel.

The steam reforming reaction proceeds according to the equation:

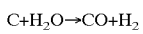

In the second stage of the process of the present invention the carbon monoxide and the hydrogen are oxidized to carbon dioxide and water. This is generally carried out using oxygen gas as the oxidizing agent. The oxidation reaction may be carried out in the same vessel as, or a different vessel from, that in which the steam reforming reaction is carried out. For example, when the steam reforming reaction is carried out in a fluidized bed reactor, the oxygen may be introduced into the upper portion of the fluidized bed reactor, so that both steps of the process are carried out in a single reactor vessel.

The advantage of the process of the present invention, as compared to the combustion of radioactive graphite, is that it can be carried out under appropriately controlled containment conditions. The loss of hazardous or radioactive materials in the off-gas is therefore reduced or even eliminated. Another significant benefit is the low volume of off-gas that simplifies handling including the possibility of achieving substantially zero gaseous emissions. Further, the process enables the Wigner energy stored in the radioactive graphite to be released in a controlled manner.

The present invention will be further described with reference to FIG. 1 of the accompanying drawings which is an overview flow diagram of one means of carrying out the process of the present invention.

Referring to the drawing, radioactive graphite is remotely removed from a nuclear reactor core by means of water jet or mechanical cutters. Graphite pieces and water are introduced into a size reduction wet grinder 1 where the graphite is reduced to <1.0 cm size. The size-reduced graphite is then mixed with water in vessel 2 and the slurry is fed directly into the fluidized bed reformer 4 by means of a slurry injector pump 3, without any other pre-treatment or handling required. Alternatively, graphite can be size reduced to <12.0 cm, preferably less than 4.0 cm for direct injection into the reformer 4 by means of a mechanical screw conveyor 5.

The fluidized bed reformer 4 serves to evaporate all water from the graphite slurry and other liquid waste feeds and to pyrolyze any organic components through destructive distillation (pyrolysis). Energy needed to evaporate the feed water and drive the endothermic reformation process is provided by operating the fluid bed in an autothermal steam reforming mode.

The off-gas from the reformer 4, which leaves the reformer along line 7, contains fine particulates, including most radionuclides and non-volatile inorganic materials, such as silica and calcium and gaseous components such as steam, carbon dioxide and gaseous radionuclides, particularly tritium, carbon-14 and iodine. The solid residue is elutriated from the reformer 4 by the fluidizing steam and gases.

The particulates in the off-gas from the reformer are removed from the off-gas stream by a high temperature filter or wet scrubber 8. If only graphite is to be processed by the process, a high temperature particulate filter is all that is needed to clean all non-volatile radionuclides from the off-gas. If other streams are being processed, the wet scrubber is utilized as shown in FIG. 1. Table 1 provides a list of typical radionuclides found in moderator graphite and how the radionuclides found in moderator graphite and how the radionuclides are partitioned in the process of the present invention

TABLE 1

Typical Radionuclide Partition

| Radionuclide | Partitions to | Radionclide | Partitions to |
|---|---|---|---|
| Antimony 125 | Scrubber Solution | Iodine 29 | Off-Gas |
| Calcium 41/45 | Particulate | Iron 55 | Particulate |
| Carbon 14 | Off-Gas | Manganese 54 | Particulate |
| Cerium 144 | Particulate | Nickel 59/63 | Particulate |
| Caesium 134/137 | Scrubber Solution | Plutonium 293/240/241 | Particulate |
| Chlorine 36 | Scrubber Solution | Ruthenium 106 | Particulate |
| Cobalt 60 | Particulate | Strontium 90 | Scrubber Solution |
| Hydrogen 3 | Condensate | Zinc 65 | Particulate |

Utilization of the wet scrubber 8 cleans the off-gas by removing particles elutriated from the reformer 4 and neutralizes any potential acid gases. The scrubber solution is concentrated by the hot off-gas from the reformer 4 to 1% to 20% by weight solids. The pH in the scrubber solution is controlled between 5.0 and 7.0 to minimize carbon dioxide absorption and to ensure removal of acid gases. The salt solution can be directed along line 9 for treatment by conventional means, such as direct discharge (if radioactivity levels permit), discharge after selective removal of radioactive species, or encapsulation to form solid waste. Insoluble constituents in the scrubber solution can be removed by filtration if a discharge route is chosen.

The warm, water-saturated off-gas stream leaves the scrubber 8 along line 10 and can be further processed to remove essentially all the water vapor by means of a refrigerated condenser 11. The condensed water leaving the condenser 11 along line 12 will include essentially all the tritium from the graphite. The condenser water, with trace levels of tritium, can be handled by one or more of the following methods. It can be recycled to provide for water cutting duty, or to supply superheated steam to the reformer. Alternatively it can be discharged as water vapor or liquid water, or used to mix with cement for solidification of other radioactive waste. Some of the iodine in the off-gas will also tend to be carried with the water leaving the condenser 11 along line 13.

The cool, dry off-gas consists almost exclusively of carbon-dioxide and small amounts of oxygen and nitrogen. If allowed by regulation, the carbon-dioxide rich off-gas can be HEPA filtered in vessel 14, monitored at 15, and then discharged to the facility stack at 16. If required by regulation, carbon dioxide can be removed from the off-gas by a refrigerated $CO_2$ condenser 18. The concentrated carbon dioxide can be transferred along line 20 for conversion into a solid carbonate salt. The remaining non-condensable gases can then be circulated along line 19 to the HEPA filter 14, monitored and then discharged to the facility stack 16. The final small off-gas flow represents less than 5% of the off-gas flow from the outlet of the reformer.

The concentrated carbon dioxide stream 20 issuing from the condenser is next converted to a solid, inert carbonate compound. Preferably, the carbon dioxide is reacted with calcium or magnesium oxides or metals in reaction vessel 21 to produce insoluble magnesium or calcium carbonate salts. Alternatively, carbon dioxide may be reacted with MAGNOX fuel element debris waste is described in several publications (e.g., "CEGB dissolves Magnox fuel element debris at Dungeness" by FH Passant, CP Haigh and ASD Willis Nuclear Engineering International, Feb. 1988 pp 44–51). Once the carbonate salt is formed, in can then be conveniently used to fill void spaces in existing radioactive waste disposal containers.

It will be apparent to those skilled in the art that many substitutions and modifications can be made to the foregoing preferred embodiments without departing from the spirit and scope of the present invention, defined by the appended claims.

What is claimed:

1. A process for the treatment of radioactive graphite, said radioactive graphite including radioactive contaminants, comprising the steps of:

reacting radioactive graphite at a temperature above 350° C. with superheated steam to form hydrogen, carbon monoxide, and radioactive contaminants; and reacting said hydrogen and said carbon monoxide with oxygen to form water and carbon dioxide in an enclosed vessel under an inert atmosphere; and processing said radioactive contaminants of said radioactive graphite.

2. The process of claim 1, wherein said process is carried out within the containment of a nuclear reactor.

3. The process of claim 1, wherein said second reacting step occurs at a temperature above 250° C.

4. The process of claim 1, wherein said process further includes the step of converting hydrogen to water using a hydrogen converter.

5. A process for the treatment of radioactive graphite, said radioactive graphite including radioactive contaminants, comprising the steps of:

removing particles of radioactive graphite from a nuclear reactor containment;

placing said particles of said radioactive graphite into a fluidized bed reformer;

reacting radioactive graphite at a temperature in the range of 250° to 900° C. with superheated steam to form hydrogen, carbon monoxide, and radioactive contaminants;

reacting said hydrogen and said carbon monoxide with oxygen to form water and carbon dioxide in an enclosed vessel under an inert atmosphere; and processing said radioactive contaminants of said radioactive graphite.

6. The process of claim 5, wherein said process further includes the step of reducing the size of said particles of said radioactive graphite prior to placing said particles into said fluidized bed reformer.

7. The process of claim 6, wherein said reducing step includes reducing said particles of said graphite to a size less than 12.0 cm.

8. The process of claim 5, wherein said placing step includes placing said particles of said radioactive graphite into said fluidized bed reformer with a screw conveyor.

9. The process of claim 5, wherein said process further includes the step of introducing said particles of said radioactive graphite and water into a size-reduction grinder to form a slurry that is introduced into said fluidized bed reformer with an injector pump.

10. The process of claim 5, wherein said process includes reacting said radioactive graphite at a temperature in the range of 600° C. to 700° C.

11. The process of claim 5, wherein said process includes removing said radioactive contaminants with a high temperature filter.

12. The process of claim 5, wherein said process includes removing said radioactive contaminants with a wet scrubber.

13. The process of claim 5, wherein said first reacting step includes adding said oxygen to said superheated steam to provide energy to form said carbon monoxide, said hydrogen, and said radioactive contaminants from said radioactive graphite.

* * * * *